June 19, 1923.  K. FÖLSCHE  1,459,621
PROCESS AND DEVICE FOR EMPTYING BEETROOT SILOS
Filed Aug. 15, 1921   2 Sheets-Sheet 1
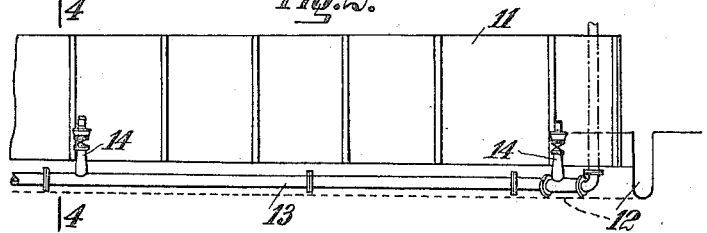
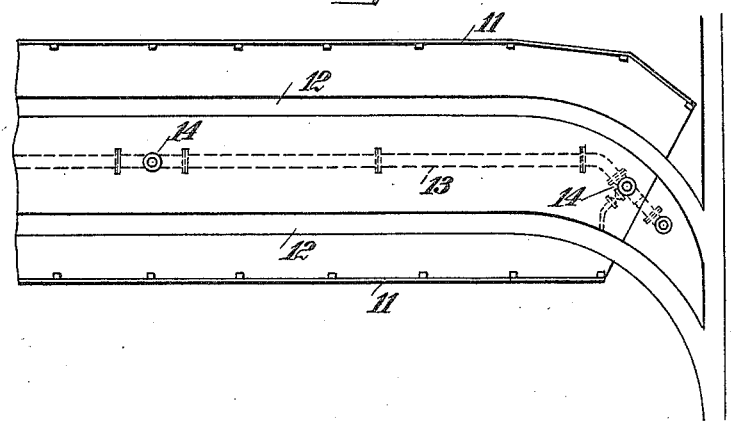
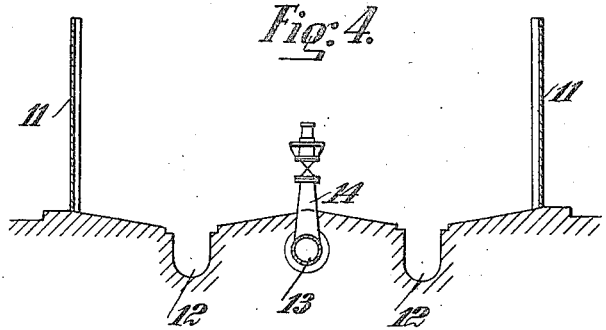
Inventor.
Karl Fölsche
By [signature]
Atty.

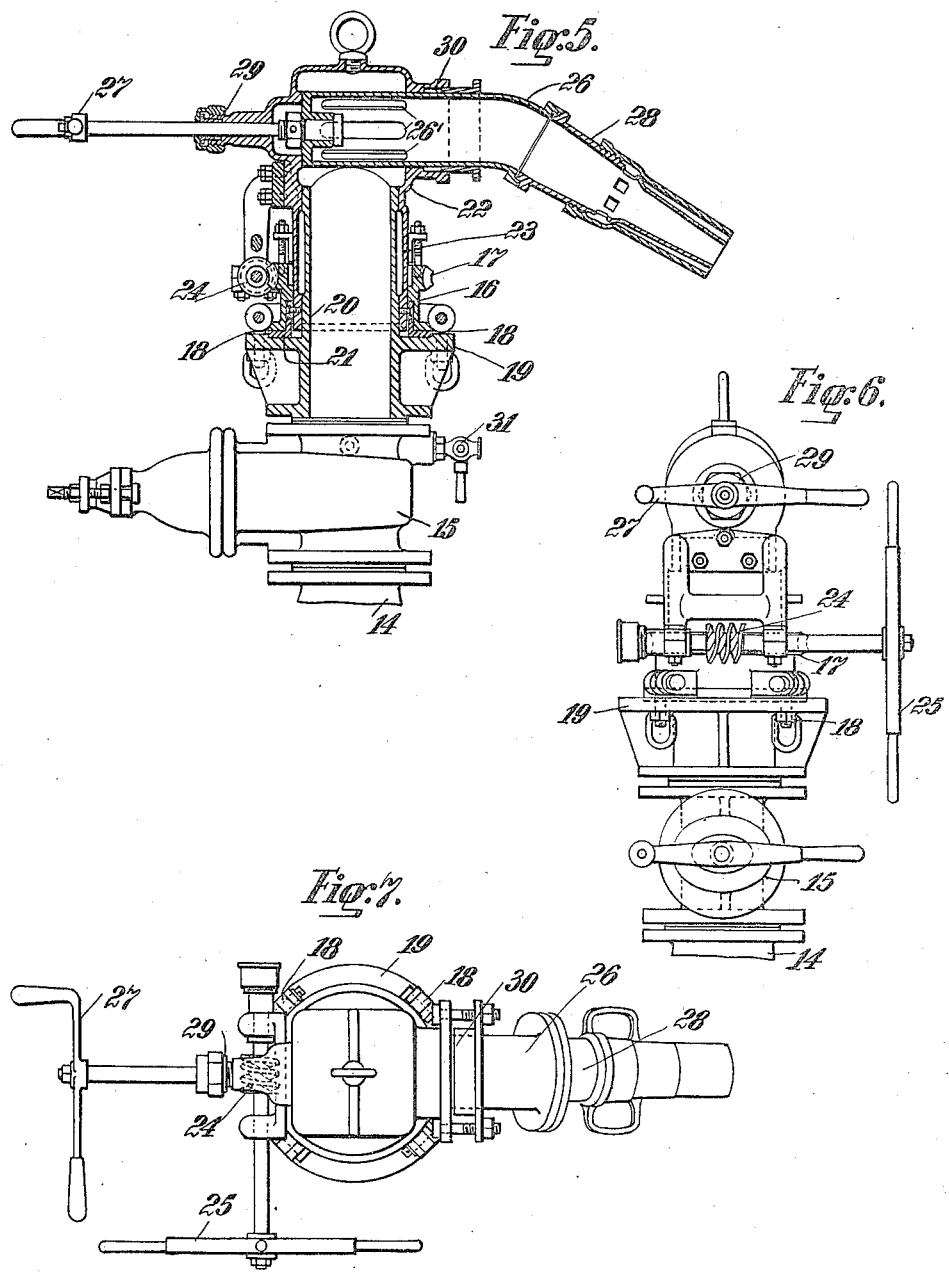

Patented June 19, 1923.

1,459,621

UNITED STATES PATENT OFFICE.

KARL FÖLSCHE, OF HALLE-ON-THE-SAALE, GERMANY.

PROCESS AND DEVICE FOR EMPTYING BEETROOT SILOS.

Application filed August 15, 1921. Serial No. 492,455.

*To all whom it may concern:*

Be it known that I, KARL FÖLSCHE, residing at 5 Hagenstrasse, Halle-on-the-Saale, Germany, have invented certain new and useful Improvements in Processes and Devices for Emptying Beetroot Silos (for which applications for patents have been filed in Germany, August 11th and August 12th, 1919; in Czechoslovakia, July 30, 1920; in Poland, August 3, 1920; in Hungary August 26th, 1920; and in the Netherlands February 14, 1921), of which the following is a specification.

This invention relates to a process for emptying beetroot silos. It is known that beetroot are stored before use in sugar mills in silos which consist of sheds about 4 to 5 yards in breadth and about 100 or more yards in length and which have a channel or flume in their bottoms extending along the middle axis, or two flumes one at each side of the middle line. The bottom of the silo slopes down towards the flume or flumes. Hitherto the procedure in emptying such beetroot silos has been the following:—The launders were covered with iron plates before the silo was filled so that the beetroot could not drop into the flumes. Then a stream of water was conducted through the flumes towards the discharge end of the silo after the covering plate nearest to the discharge end was taken off the launder. The beetroot were then thrown by workmen armed with pitchforks or rakes into the flume and carried away by the water current. As the work proceeded one plate after the other was taken off the flume.

The work of emptying a silo described above not only involves a great loss of time, expense and muscular effort, but also causes a great loss in sugar, especially if the contents of the sheds are in a frozen condition, when picks and blasting have to be resorted to to loosen the solid mass of frozen beets. This causes breaking up of the roots, which freshly exposed surfaces contain sugar cells from which the transports of water dissolves, either directly or by diffusion, sugar. This loss is avoided when handling beets by my method.

By my novel process the emptying of silos is quickened and cheapened. The beetroot are prevented from being injured and all risks to workmen are eliminated.

The ordinary form of silo is adhered to. The flume in the bottom is not covered by plates as hitherto. When the emptying operation is to take place no water current is conducted through the flume, but instead of this and in accordance with my invention the beetroots at the discharge end of the silo are washed into the flume by a powerful water jet from a nozzle connected to an upright pipe. The beetroots are then borne off by the water in the flume. A number of upright pipes are provided in each shed at intervals of about 10 to 12 yards.

I will now describe my invention in greater detail in reference to the accompanying drawing in which Fig. 1 is a plan on a small scale of a beetroot silo with two flumes, Fig. 2 is a side view of a portion of a silo at the discharge end on an enlarged scale, Fig. 3 is a plan corresponding to Fig. 2, Fig. 4 is a section of Fig. 2 on the line 4—4.

Figs. 5–7 illustrate on an enlarged scale the squirting pipe used for the process and the method of fixing it, Fig. 5 being a side view of an upright pipe and the squirting pipe attached to it, partly in section, Fig. 6 is a side view of Fig. 5, and Fig. 7 a plan view of Fig. 5.

The silo has two side walls 11. Two flumes 12 are arranged in the floor which slopes down from the middle line and the two walls towards the flumes. A feed pipe 13 is laid underground which extends beneath the middle line of the silo and is connected to a water main carrying water under pressure. At suitable intervals of about 10 to 12 yards upright pipes 14 are connected to the underground pipe, each pipe 14 being capable of being closed by a valve 15 (see Figs. 5 and 6). One of these upright pipes 14 is arranged near the discharge end of the silo. Prior to throwing the beetroot in the silo the upright pipes are preferably covered with a sheet metal hood. The various upright pipes are thus located within the heap of beetroot with the exception of the pipe nearest to the discharge end which is left uncovered.

Onto this pipe the squirting pipe shown in Figs. 5-7 is fixed when the silo is to be emptied. When the valve 15 is opened a powerful jet of water is directed by the squirting pipe against the beetroot in its vicinity and the beetroot as thus washed into the flumes and borne off by the water that flows away in the same. At first the beetroot next to the squirting pipe are washed away, and then, by altering the direction of the water jet, the masses of beetroot lying farther back are also carried off until the next upright pipe is uncovered. Then the valve of the first upright pipe is closed, the water above the valve allowed to discharge, the squirting valve screwed off and carried to the next upright pipe and fixed onto it.

In this way the whole silo can be emptied without necessitating any special act of uncovering the flumes and the throwing of the beetroot into the flumes by workmen using pitchforks, picks and rakes. As the floor of the silo is also washed perfectly clean by the water jet the workmen are not liable to slip and the act of carrying the squirting pipe from one upright pipe to another is not attended with any risk.

The squirting pipe is preferably constructed as shown in Figs. 5-7. It has a base 16 with a wormwheel 17 which can be fixed by four hinged bolts 18 to the flange 19 of a tubular extension 20 arranged above the valve 15 of the upright pipe. 21 is a packing ring between the base and the flange. The casing 22 of the squirting pipe is arranged to rotate relatively to the base 16, this casing having a downwardly projecting cylindrical portion 23 which fits tightly on the upper part of the pipe 20. Mounted on the casing 22 is a worm 24 which engages with the worm wheel 17 and can be turned in opposite directions by a handwheel 25.

A section of pipe 26 is arranged to rotate on a horizontal axis in the upper part of the casing 22. The section of pipe 26 has a two-armed handle or crank 27 attached to its end. Fixed to its other end is a nozzle 28 inclined at an angle of 30-40° to the horizontal. 29 and 30 are stuffing boxes.

After the squirting pipe has been fixed by hinged screws 18 on an upright pipe the valve 15 is opened and the water under pressure passes through the pipe 20 into the casing 22 and then through slots 26′ into the horizontal pipe 26 whence it flows to the nozzle 28 from which it is squirted in the form of an undivided jet. By turning the handwheel 25 the jet can be swung round and by rotating the crank 27 its height can be changed. The direction of the jet can thus be altered at will.

The operation of squirting from an upright pipe is proceeded with until the next upright pipe has been uncovered. When this has been accomplished the valve of the squirting head is closed and its hinged bolts are loosened. The squirting head can then be easily taken off the upright pipe on which it was fixed and carried by a single workman to next upright pipe and fixed onto it. The water in the vertical pipe 20 may be discharged through an escape cock 31.

The squirting equipment may be varied in various ways without departing from the scope of my invention. It has been found in practice that the constructional form described herein is a particularly advantageous type of equipment.

I claim:

1. The method of discharging beet-root silos having a plurality of water-supply stations and a discharge flume, which comprises discharging the roots into the flume at one end of the silo by a water jet from a nozzle attached to one of said supplies within the effective range of said jet and then transferring said nozzle to an adjacent station of the silo for continuing the discharge of the roots into the flume.

2. The combination with a beet-root silo and a flume for receiving the beets from the silo; of a conduit for water along the silo, valved leads from said conduit spaced along the conduit, and a detachable nozzle for attachment to any one of said leads to wash the beet-roots into said flume.

3. In combination with a silo for beet-root, an emptying equipment comprising a supply pipe carrying water under pressure and extending along the silo in the direction of its length, a plurality of upright pipes connected to the supply pipe, a valve associated with each upright pipe, a portable squirting pipe, means for fixing the squirting pipe on the upright pipes and means for changing the elevation and direction of the squirting pipe.

4. The combination with a beet root silo having a flume therein, a conduit for water under pressure having valved leads up into the silo; of a detachable manually operated nozzle for attachment to any one of said leads to wash the roots into said flume.

5. The combination with a beet root silo having a flume extending longitudinally of its bottom; of a pipe for carrying water under pressure, extending under the silo and having a valved branch pipe projecting into the bottom of the silo, a detachable, rotatable jet device or nozzle for attachment to said branch pipe and means to rotate and elevate said nozzle.

6. The combination with a beet root silo having a flume and a pipe for water under pressure extending beneath the silo; of valved branch pipes extending through the bottom of the silo into the same, a detachable jet device for attachment to any one of said pipes comprising a base detachably fitting onto the end of a branch pipe, a worm wheel thereon, a casing fitting on said branch pipe, a worm carried by said casing and engaging the worm wheel, a rotatable pipe extending across the casing and having a nozzle inclined thereto and means to rotate the latter pipe and nozzle.

In testimony whereof I have signed this specification in the presence of two witnesses.

KARL FÖLSCHE.

Witnesses:
 KURS KRUGER,
 WILLY SCHMIDT.